US012432362B2

(12) United States Patent
Ansorregui Lobete et al.

(10) Patent No.: US 12,432,362 B2
(45) Date of Patent: Sep. 30, 2025

(54) ENCODING AND DECODING VIDEO DATA

(71) Applicant: SAMSUNG ELECTRONICS CO., LTD., Suwon-si (KR)

(72) Inventors: Daniel Ansorregui Lobete, Chertsey (GB); Paul Wisbey, Chertsey (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/949,730

(22) Filed: Sep. 21, 2022

(65) Prior Publication Data
US 2023/0067994 A1 Mar. 2, 2023

Related U.S. Application Data

(63) Continuation of application No. PCT/KR2022/006176, filed on Apr. 29, 2022.

(30) Foreign Application Priority Data

Sep. 2, 2021 (GB) ..................................... 2112490

(51) Int. Cl.
*H04N 19/23* (2014.01)
*A63F 13/355* (2014.01)
(Continued)

(52) U.S. Cl.
CPC ........... *H04N 19/23* (2014.11); *A63F 13/355* (2014.09); *A63F 13/358* (2014.09); *A63F 13/52* (2014.09);
(Continued)

(58) Field of Classification Search
CPC ...... H04N 19/395; H04N 19/90; H04N 19/99; H04N 19/235; H04N 19/23; G06V 40/16;
(Continued)

(56) References Cited

U.S. PATENT DOCUMENTS 5,706,367 A * 1/1998 Kondo ............... H04N 21/4435
375/E7.076
5,870,502 A * 2/1999 Bonneau ................ G06V 40/16
375/240.1

(Continued)

FOREIGN PATENT DOCUMENTS

CA 3112906 A1 * 4/2020 ......... A63F 13/2145
CN 106664417 A * 5/2017 ............... G06T 7/11
(Continued)

OTHER PUBLICATIONS

International Search Report and Written Opinion dated Aug. 1, 2022 issued by the International Searching Authority in International Application No. PCT/KR2022/006176 (PCT/ISA/220, PCT/ISA/210, and PCT/ISA/237).

(Continued)

*Primary Examiner* — David N Werner
(74) *Attorney, Agent, or Firm* — Sughrue Mion, PLLC

(57) ABSTRACT

A method, computing device and a computer-readable storage medium for encoding and decoding video data for streaming are provided. The method includes receiving video data comprising frames; accessing a dataset comprising at least one image expected to have similarity to at least one of the frames of the received video data; selecting an image or a portion of the image, from the dataset based on similarity to at least a portion of a first frame of the received video data; generating a frame using the image or the portion of the image selected from the dataset; encoding the generated frame and the frames of the received video data to produce encoded video data; and removing data corresponding to the generated frame from the encoded video data to produce modified encoded video data and generating data identifying the image or the portion of the image selected from the dataset.

10 Claims, 10 Drawing Sheets

(51) Int. Cl.

| | |
|---|---|
| *A63F 13/358* | (2014.01) |
| *A63F 13/52* | (2014.01) |
| *G06T 9/00* | (2006.01) |
| *G06V 40/16* | (2022.01) |
| *H04N 19/119* | (2014.01) |
| *H04N 19/136* | (2014.01) |
| *H04N 19/167* | (2014.01) |
| *H04N 19/17* | (2014.01) |
| *H04N 19/172* | (2014.01) |
| *H04N 19/177* | (2014.01) |
| *H04N 19/30* | (2014.01) |
| *H04N 19/70* | (2014.01) |
| *H04N 19/85* | (2014.01) |
| *H04N 19/90* | (2014.01) |
| *A63F 13/525* | (2014.01) |

(52) U.S. Cl.
CPC .............. *G06T 9/00* (2013.01); *G06V 40/16* (2022.01); *H04N 19/119* (2014.11); *H04N 19/136* (2014.11); *H04N 19/167* (2014.11); *H04N 19/17* (2014.11); *H04N 19/172* (2014.11); *H04N 19/177* (2014.11); *H04N 19/395* (2014.11); *H04N 19/70* (2014.11); *H04N 19/85* (2014.11); *H04N 19/90* (2014.11); *H04N 19/99* (2014.11); *A63F 13/525* (2014.09); *A63F 2300/538* (2013.01)

(58) Field of Classification Search
CPC ........ A63F 13/52; A63F 13/53; A63F 13/355; A63F 13/358; A63F 13/525; A63F 2300/538
See application file for complete search history.

(56) References Cited

U.S. PATENT DOCUMENTS

| | | | |
|---|---|---|---|
| 7,167,519 B2 | 1/2007 | Comaniciu et al. | |
| 9,358,456 B1* | 6/2016 | Challinor | A63F 13/44 |
| 9,961,124 B2 | 5/2018 | Bae | |
| 10,049,646 B2 | 8/2018 | Diard et al. | |
| 10,812,562 B1* | 10/2020 | Mitchell | H04L 65/765 |
| 10,862,938 B1* | 12/2020 | Mitchell | H04L 65/61 |
| 11,347,792 B2 | 5/2022 | Zhang et al. | |
| 2004/0062440 A1* | 4/2004 | Srinivasa | H04N 19/23 345/473 |
| 2004/0218827 A1 | 11/2004 | Cohen et al. | |
| 2007/0010329 A1* | 1/2007 | Craig | A63F 13/355 463/42 |
| 2012/0114172 A1* | 5/2012 | Du | G06V 40/165 382/103 |
| 2012/0270652 A1* | 10/2012 | Kim | A63F 13/52 463/32 |
| 2015/0334398 A1* | 11/2015 | Socek | H04N 19/182 375/240.26 |
| 2016/0269734 A1* | 9/2016 | Tong | H04N 19/176 |
| 2016/0271495 A1* | 9/2016 | Perrin | H04N 19/154 |
| 2016/0309192 A1 | 10/2016 | Bankoski et al. | |
| 2017/0272768 A1* | 9/2017 | Tall | G06V 40/193 |
| 2017/0310972 A1* | 10/2017 | Wang | H04N 19/105 |
| 2018/0131950 A1* | 5/2018 | Guo | H04N 19/25 |
| 2018/0167610 A1 | 6/2018 | Park et al. | |
| 2019/0037222 A1* | 1/2019 | Gu | H04N 19/167 |
| 2019/0046876 A1* | 2/2019 | Dietrich | A63F 13/355 |
| 2019/0079639 A1* | 3/2019 | Lindberg | H04N 19/17 |
| 2021/0162302 A1 | 6/2021 | Perlman et al. | |
| 2021/0216811 A1 | 7/2021 | Yao | |
| 2021/0337248 A1* | 10/2021 | Huang | H04N 5/265 |
| 2021/0368206 A1* | 11/2021 | Sugano | G06T 15/04 |
| 2021/0383125 A1* | 12/2021 | Joo | G06T 5/92 |
| 2024/0064309 A1* | 2/2024 | Ma | G06V 10/771 |

FOREIGN PATENT DOCUMENTS

| | | | |
|---|---|---|---|
| CN | 107358656 A * | 11/2017 | ............. A63F 13/52 |
| CN | 111617464 A * | 9/2020 | |
| WO | 2012/088403 A2 | 6/2012 | |

OTHER PUBLICATIONS

Communication dated Jun. 9, 2022 issued by the Great Britain Intellectual Property Office in Great Britain Application No. GB2112490.4.

"Video compression picture types", Wikipedia, Jun. 17, 2022, 4 pages total, https://en.wikipedia.org/wiki/Video_compression_picture_types.

Xiaoming Nan et al., "A Novel Cloud Gaming Framework Using Joint Video and Graphics Streaming", IEEE Xplore, 2014 IEEE International Conference on Multimedia and Expo (ICME), DOI: 10.1109/ICME.2014.6890204, Jul. 2014, 8 pages total.

Philippe Bordes et al., "AHG17: External reference picture", Joint Video Experts Team (JVET) of ITU-T SG 16 WP 3 and ISO/IEC JTC 1/SC 29/WG 11, Document: JVET-P0326, Sep. 2019, 5 pages total, XP030216941.

* cited by examiner

ENCODING AND DECODING VIDEO DATA

CROSS-REFERENCE TO RELATED APPLICATIONS

This application is a by-pass continuation application of International Application No. PCT/KR2022/006176, filed on Apr. 29, 2022, which claims priority to United Kingdom Patent Application No. 2112490.4, filed on Sep. 2, 2021, in the United Kingdom Intellectual Property Office, the disclosures of which are incorporated by reference herein in their entireties.

BACKGROUND

1. Field

The disclosure relates to streaming video data, including encoding video data for streaming and decoding streamed video data.

2. Description of Related Art

Video streaming benefits from high bitrate communication being available between server and client devices. Video coding techniques are used to compress video data so that high quality video streaming can be attempted with lower bitrate connections. Examples of well-known video coding techniques/standards used for streaming video include H264 (AVC), H265 (HEVC), VP9, VP10 (AV1) and MPEG4. These work by splitting videos into chunks, commonly called Groups of Pictures (GOP). The key frame in a GOP is complete/self-contained (coded without reference to any other frame) and subsequent frames can be decoded by referring to it using motion vectors. As the frames are similar, small (4×4, 4×8, 8×8, ...) blocks can be reused. In HEVC, for example, one type of key frame is called an I-frame and most of the bitrate (e.g. 40%+) in a video stream is typically used for transmitting I-frames. Thus, having more I-frames uses much bandwidth. However, having fewer I-frames can lead to decoding problems in the event of a poor connection.

Mobile devices, such as smartphones, in particular may not always have access to a fast, stable data connection. Further, the computational power and storage capacity of such devices can also be relatively limited. Thus, even when using video coding techniques mobile devices may not be able to offer smooth, continuous video streaming.

In recent years video game streaming, such as cloud gaming, has become popular. Typically, a client device connects to a server class device over a network connection to interact with a gaming application being executed on that, instead of downloading the application and executing it using the client device's own hardware. The server streams a live feed of video and audio output by the application and also receives inputs from the client device and translates them into gaming commands. Game streaming requires very good video quality and extremely low latency and so bandwidth requirements are high.

In the particular case of streaming a video game small GOPs are used having many regular spaced I-frames, typically one transmitted every second. The video quality is therefore highly dependent on the availability of a CPU to perform prediction search and how much bandwidth is available. As streaming is a real-time process the CPU budget for motion vector search is limited and so bandwidth usage is usually very large as a result. Also, intermittent transmission of larger I-frames between more regular transmission of other, smaller types of frames results in spiky, rather than flat, bandwidth requirements.

Existing solutions to the problems associated with video streaming, including game streaming, include providing dedicated hardware intended to use less bandwidth. However, these solutions require expensive hardware.

SUMMARY

Embodiments of the present invention can address at least some of the above technical problems.

Embodiments can be based on the present inventors' appreciation that videos including repetitive content, such as those output by game applications, have certain characteristics that can be exploited to improve bandwidth usage. In particular, a game application will typically have a fixed set of graphical assets (e.g. characters or level/location backgrounds) that are used over and over again. At least one "dictionary" dataset of images can be created based on these. This dataset can be streamed to, and/or stored locally, at the client device. The dataset can be used by the server to encode repeated content more efficiently by effectively removing the need to transmit a first full frame, e.g. the I-frame of a GOP, in the bitstream, thereby reducing the overall amount of data transmitted. Metadata identifying the dictionary dataset and an image (or image portion) within it can be transmitted instead of the full I-frame. That is, the original I-frame can be replaced by the metadata and a P-frame. The client device can use the metadata to access its local copy of the full frame (or reconstruct the full frame) and can then use that to decode the frames in the bitstream. Some preprocessing of the video data may be done on the inputs/outputs of the video encoder/decoder, but there is no need for any modification of the hardware or the codec/standard video coding in order to benefit from using the dataset.

According to a first aspect of the present invention there is provided a computer-implemented method of encoding video data, the method comprising: receiving video data comprising frames; accessing a dataset comprising at least one image expected to have similarity to at least one of the frames of the received video data; selecting an image or a portion of the image, from the dataset based on similarity to at least a portion of a first frame of the received video data; generating a frame using the image or the portion of the image selected from the dataset; encoding the generated frame and the frames of the received video data to produce encoded video data, and removing data corresponding to the generated frame from the encoded video data to produce modified encoded video data and generating data identifying the image or the portion of the image selected from the dataset.

In an embodiment, the above method may further include: transmitting the modified encoded video data as a bitstream, and data identifying the image or the portion of the image selected from the dataset, to a client device (for decoding). The client device can be configured to access a corresponding dataset.

In an embodiment, wherein the generated frame may be prepended as a first frame to the received video data such that the generated frame is encoded as a key frame of the encoded video data.

In an embodiment, wherein the received video data may be generated by a current execution of an application, such as a gaming application, and the at least one image in the dataset may be generated by at least one previous execution of the (same) application. Alternatively, the received video data may be a video in a series, e.g. produced by one content creator entity, and the at least one image in the dataset may be obtained from at least one other video in the (same) series. The videos in the series may be created by at least partially reusing some content, e.g. titles, animations, specific scenes or sequences, etc.

In an embodiment, wherein the above method comprising accessing a plurality of datasets, each comprising a plurality of images expected to have similarity to at least one of the frames of the received video data, and wherein each of the plurality of datasets is associated with a different layer of the first frame, and the above method further comprises: performing image segmentation on the first frame to obtain a foreground layer image and a background layer image; selecting an image from a first dataset that has similarity to the foreground layer image; selecting an image from a second dataset that has similarity to the background layer image; generating data identifying the images selected from the first dataset and the second dataset, and generating the frame by combining the images selected from the first dataset and the second dataset.

The at least one image in the dataset may comprise a full frame of video data, or it/they may comprise a portion or a layer of a full frame of video data.

Some embodiments may access a plurality of datasets, each comprising a plurality of images expected to have similarity to at least one of the plurality of frames of the received video data. In some embodiments each of the plurality of datasets may be associated with different layers of the first frame. For example, a first said dataset may comprise a foreground layer of the first frame and a second said dataset may comprise a background layer of the first frame.

The method may comprise: performing image segmentation on the first frame to obtain a foreground layer image and a background layer image; selecting a said image from a first said dataset that has similarity to the foreground layer image; selecting a said image from a second said dataset that has similarity to the background layer image; generating data identifying the images selected from the first dataset and the second dataset, and generating the frame by combining the images selected from the first dataset and the second dataset. In some cases this generating may comprise superimposing the selected foreground image on the selected background image.

In an embodiment, wherein the at least one image in the dataset may be larger in dimensions than the first frame, and the data identifying the portion of the image may comprise information, e.g. offset information, identifying a portion of the larger image that has the similarity to the first frame.

In an embodiment, wherein the larger image may be an image, e.g. background, including (spatially) repeated content.

In an embodiment, wherein the generating of the frame comprises: retrieving data comprising a pre-encoded version of the selected image, and the encoding of the generated frame and the frames of the received video data comprises: prepending the pre-encoded version of the selected image to the frames of the received video data for the encoding to produce the encoded video data.

In an embodiment, wherein the above method may further comprise: determining that none of the images in the dataset have a sufficient degree of similarity with the first frame, and subsequently storing the first frame (and, optionally, one or more subsequent frames) as a new image(s) in the dataset.

The above method may further comprise transferring an updated version of the dataset including the new image(s) to the client.

In an embodiment, wherein the data identifying the image or the image portion may be transmitted to the client device separately from the bitstream.

In an embodiment, wherein the data identifying the image or the image portion may be included in a header of a frame/packet in the bitstream.

According to another aspect of the present invention there is provided a computer device of encoding streamed video data, the computer device configured to perform the above method of encoding video data. The computer device for encoding streamed video data, comprising a memory storing instructions; and a processor configured to execute the instructions to: receive video data comprising frames; access a dataset comprising at least one image expected to have similarity to at least one of the frames of the received video data; select an image or a portion of the image, from the dataset based on similarity to at least a portion of a first frame of the received video data; generate a frame using the image or the portion of the image selected from the dataset; encode the generated frame and the frames of the received video data to produce encoded video data, and remove data corresponding to the generated frame from the encoded video data to produce modified encoded video data and generating data identifying the image or the portion of the image selected from the dataset.

According to another aspect of the present invention there is provided a non-transitory computer-readable storage medium, having a computer program stored thereon that performs, when executed by a processor, the above methods of encoding video data.

According to another aspect of the present invention there is provided a computer-implemented method of decoding streamed video data (at a client device), the method comprising: receiving a bitstream comprising frames of encoded video data; accessing a dataset comprising at least one image expected to have similarity to at least one of the frames of the encoded video data; receiving data identifying an image or a portion of the image, to be retrieved from the dataset; generating a frame using the image or the portion of the image, retrieved from the dataset; adding data corresponding to the generated frame to the bitstream; decoding the bitstream to produce decoded video data, and discarding data corresponding to the decoded generated frame from the decoded video data.

In some embodiments the server can decide to use or not use the dataset, based on client available datasets.

In an embodiment, wherein the generating of the frame comprises: encoding the generated frame using a same encoding method used to encode the video data in the bitstream, and the adding of the data comprises: prepending the data corresponding to the encoded generated frame to the bitstream to produce a modified bitstream, wherein the data corresponding to the encoded generated frame is encoded as a key frame of the encoded video data.

In an embodiment, wherein the decoding of the bitstream comprises decoding the modified bitstream including the prepended data.

In an embodiment, wherein the decoding of the bitstream comprises: decoding the modified bitstream including the prepended data.

In an embodiment, wherein the added data is a pre-encoded version of the image or the portion of the image retrieved from the dataset.

According to another aspect of the present invention there is provided a computer device of decoding streamed video data, the computer device configured to perform the above method of decoding video data. The computer device for decoding streamed video data comprising a memory storing instructions; and a processor configured to execute the instructions to: receive a bitstream comprising frames of encoded video data; access a dataset comprising at least one image expected to have similarity to at least one of the frames of the encoded video data; receive data identifying an image or a portion of the image, to be retrieved from the dataset; generate a frame using the image or the portion of the image, retrieved from the dataset; add data corresponding to the generated frame to the bitstream; decode the bitstream to produce decoded video data, and discard data corresponding to the decoded generated frame from the decoded video data.

In an embodiment, wherein the computing device further configured to: display video based on the non-discarded decoded video data.

According to another aspect of the present invention there is provided a non-transitory computer-readable storage medium, having a computer program stored thereon that performs, when executed by a processor, the above methods of encoding video data.

The dataset may be preloaded or may be at least partially received in parallel to the received encoded bitstream.

The frames generated by the application may be composed of a predefined/fixed set of graphical assets that may comprise at least one of: a user-controlled character; an application-controlled character; background images, which may be arranged as a plurality of levels.

The dataset may be selected from a plurality of datasets associated with an application. For example, there may be a plurality of datasets corresponding to a respective plurality of levels (or locations/regions, chapters, storylines, etc) of a gaming application, and the accessed dataset may be selected based on a current gameplay state of the gaming application.

According to a further aspect of the present invention there is provided a computer-implemented method of generating a dataset comprising at least one image expected to have similarity to frames in a bitstream comprising encoded video data, the method comprising: receiving video data comprising a plurality of frames (which may be output by an application, such as a video streaming or streaming video game application); selecting at least part of a said frame, and storing the at least part of the frame as an image in the dataset.

The method may select a said frame from (all/a portion of) the video data that has low/no similarity to frames already stored in the dataset, but does have similarity to other frames in the received video data.

The dataset can be useable to generate a frame for encoding or decoding video data.

The method may further comprise: performing image segmentation on the selected frame to obtain a first layer and a second layer; storing the first layer in the dataset, and storing the second layer in a further dataset. The method may further comprise transferring the dataset to a server device and a client device, or making them accessible to the server device and the client device in any suitable manner. According to yet another aspect of the present invention there is provided a computing system/devices configured to perform methods substantially as described herein.

According to another aspect of the present invention there is provided a computer readable medium storing a computer program to operate methods substantially as described herein.

According to the present invention, there is provided a method and apparatus as set forth in the appended claims. Other features of the invention will be apparent form the dependent claims, and the description which follows.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The above and other objects of the embodiments herein will be better appreciated and understood when considered in conjunction with the description and the accompanying drawings. It should be understood, however, that the following descriptions, while indicating various embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

Figure 1:
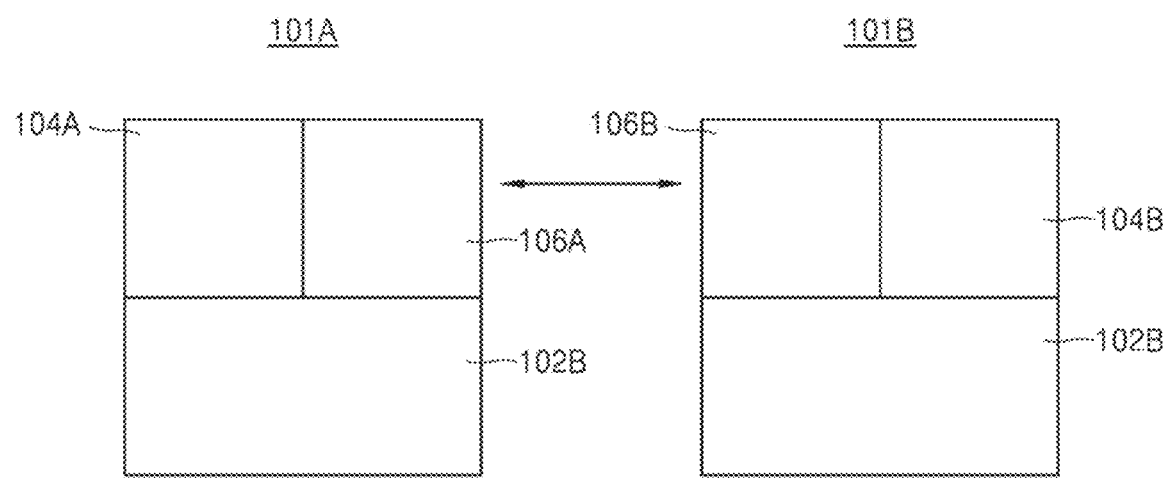
FIG. 1 is a block diagram of server and client devices configurable to execute embodiments of the invention.

FIG. 1 is a block diagram of computing devices configurable to execute embodiments of the invention. The illustrated example system comprises a first computer 101A and a second computer 101B. The first computer 101A and the second computer 101B may be referred as computing device respectively. The first and second computers can communicate when there is a functional connection over a communications network between them, e.g. a wireless internet connection, a cellular network connection, etc. The first computer 101A will typically comprise, or be associated with, at least one processor 102A, memory 104A and communications interface 106A. In addition, the memory (104A) may, in some examples, be considered a non-transitory storage medium. The term "non-transitory" may indicate that the storage medium is not embodied in a carrier wave or a propagated signal. However, the term "non-transitory" should not be interpreted that the memory (104A) is non-movable. In some examples, the memory (104A) can be configured to store larger amounts of information than the memory. In certain examples, a non-transitory storage medium may store data that can, over time, change (e.g., in Random Access Memory (RAM) or cache). The memory (104A) can be an internal storage or it can be an external storage unit of the electronic device (100), a cloud storage, or any other type of external storage.

The second computer 101B will also typically comprise, or be associated with, at least one processor 102B, memory 104B and communications interface 106B. Common components of the computers, e.g. user input/output units, etc, are well-known to the skilled person and are not shown or described herein in detail.

In example embodiments the first computer 101A can comprise a server that may function as part of a Cloud service. However, any step described herein as being performed by the server (or any data stored/processed by it) could be performed/stored by other devices via the Cloud. In embodiments the first computer may function as a source of video data that is to be streamed to at least one client device. In some cases the first computer may execute an application, such as a server-side video streaming or streaming gaming application, that interacts with the second computer/client device via a corresponding client-side streaming application or website. For brevity, the operations performed by one client device only will be described below; however, it should be understood that such operations can be performed by any reasonable number of client devices in communication with one or more suitably-configured server.

In example embodiments the second computer 101B comprises a mobile device, such as a smartphone, tablet or handheld gaming device. However, many variations are possible, e.g. the first computer 101A may comprise a server in connection with one or more (same or different types of) laptop or desktop computers, or the second computer may comprise a desktop computer that accesses the video/game streaming service via a website.

Furthermore, one or more computer-readable storage medium may be utilized in implementing embodiments consistent with the disclosure. A computer-readable storage medium refers to any type of physical memory on which information or data readable by a processor may be stored. A computer-readable storage medium may store instructions for execution by one or more processors, including instructions for causing the processors to perform steps or stages consistent with the embodiments described herein. The term "computer-readable medium" should be understood to include tangible items and exclude carrier waves and transient signals, e.g., non-transitory. Examples include Random Access memory (RAM), Read-Only memory (ROM), volatile memory, non-volatile memory, hard drives, Compact Disc (CD) ROMs, Digital Video Disc (DVDs), flash drives, disks, and any other known physical storage media.

Figure 2:
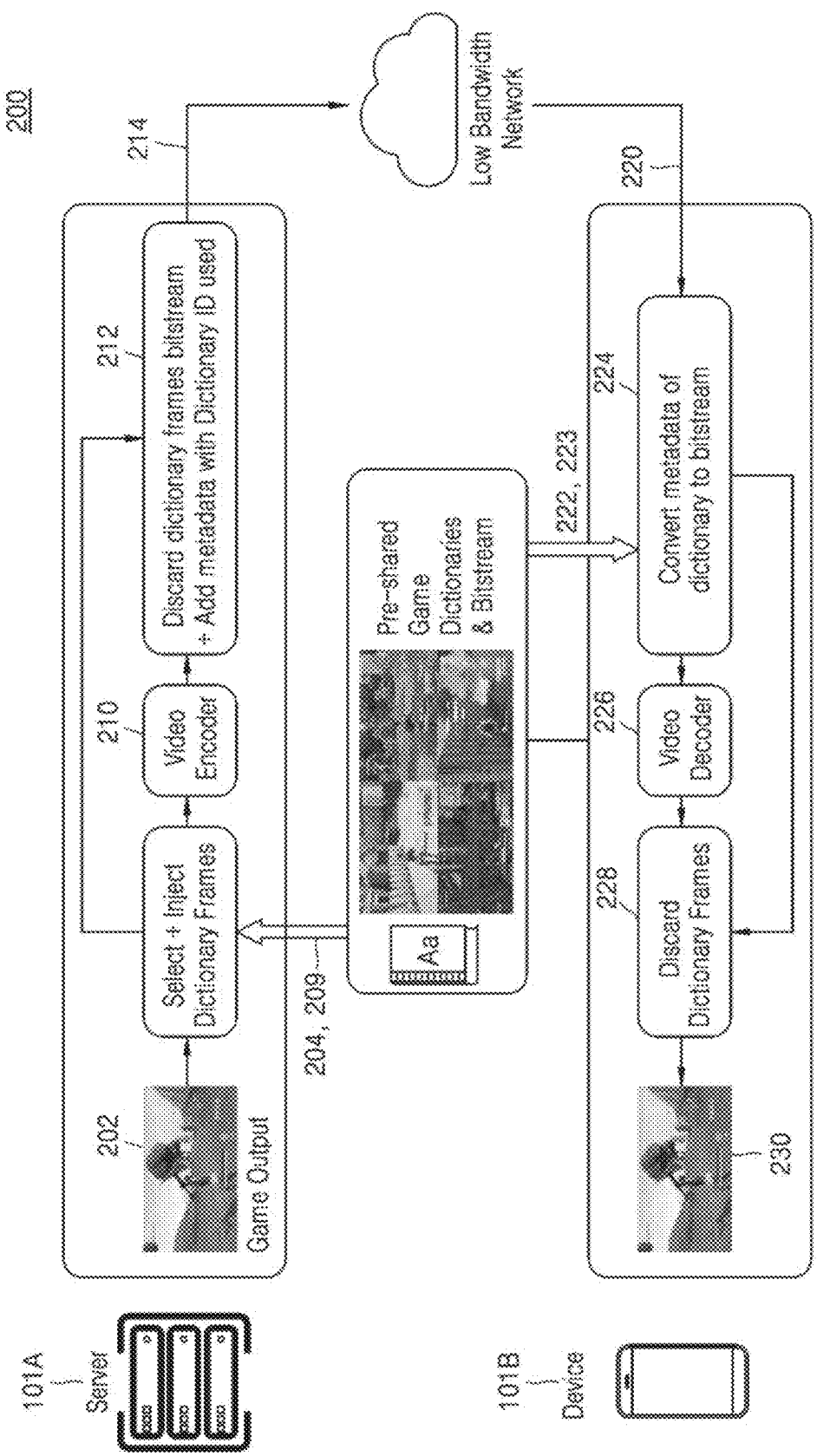
FIG. 2 is a diagram summarizing steps performed by the server and client devices according to an embodiment.

FIG. 2 is a flowchart of an example method 200 according to an embodiment and shows steps performed by means of software instructions being executed by the first computing device/server 101A and the second computing device/client 101B. It will be appreciated that at least one of the steps described herein may be re-ordered or omitted. One or more additional steps may be performed in some cases. Further, although the steps are shown as being performed in sequence in the Figures, in alternative embodiments some of them may be performed concurrently, possibly on different processors or cores. It will also be understood that embodiments can be implemented using any suitable software, programming language, data editors, etc, and may be represented/stored/processed using any suitable data structures and formats.

The method 200 can be initiated in various ways, e.g. when the application/component that generates the video to be streamed is run. Embodiments may be used at any suitable point during video encoding and decoding. For example, embodiments may be embedded as part of applications executed by the server 110A and the client 110B, or may be separate software modules called before/after use of an encoder/decoder by the applications. The encoder/decoder will typically use an existing/standard video coding technique, such as H.265, and, advantageously, embodiments perform additional steps and process data in a way that does not require the standard video coding technique/encoders/decoders to be modified, whilst still offering improved streaming efficiency.

At step 202, the server 101A can receive video data that is to be streamed to the client device 101B.

Herein, the term video data is intended to be interpreted broadly and can comprise video data in any format that can be processed for streaming and may include synchronized audio data. The video data will typically comprise raw video data, including a plurality of video frames and audio in any suitable format(s). The video data will typically have been output by an application, such as a game application, executed by the server, although it may be executed by another computer/processor that is in communication with the server in some cases. In general, a gaming application receives user input to control onscreen actions to attempt to achieve a goal in the context of a game.

Figure 5:
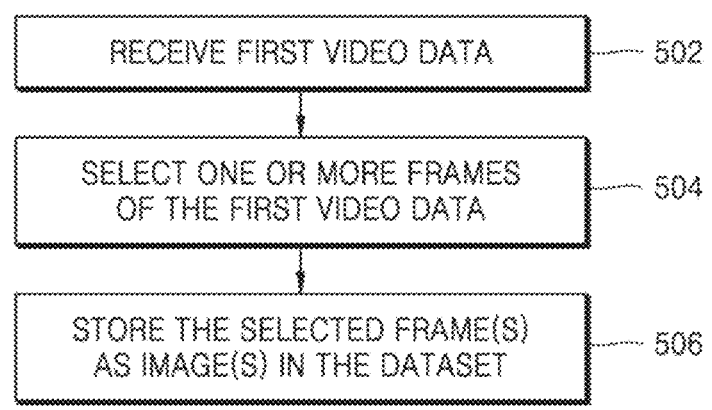
FIG. 5 is a flowchart showing how a dataset may be generated.

At step 204 the server 101A can access a dataset 206 that comprises at least one image. The dataset will typically be stored in a local data store/memory of the server and can be directly accessed for data retrieval by the server. In other cases, the dataset may be remotely stored and accessed by the server for data retrieval over a suitable communications interface/network. In embodiments both the server 101A and the client 101B access corresponding datasets that can be used as a "dictionary" of image data expected to have similarity to frames of the video data that is to be streamed. Each video-generating application may have one or more dataset specifically generated for it. In some cases, a new/different dataset will be transferred and made available to the server and/or the client depending on current usage of the applications that is outputting the video data. For instance, in a gaming application, the player moving to a new/different level/part of the game may result in a new/different dataset being transferred/stored/accessed. Each dataset may have an identifier/name that can be used for selection. FIG. 5, described below, shows how a suitable dataset may be generated. The number of images in the datasets can vary, but as an example may comprise at least 1000 images, requiring around 100 MB of storage.

In summary, embodiments can improve video streaming efficiency by means of the server 101A selecting an image (or a portion of an image) from the dataset 206 that has similarity to a first frame of the video data. That selected image/portion is used to generate a frame that is prepended to the received frames prior to encoding them all. Thus, in the case of H.265 video coding or similar, the generated frame will be encoded as an I-frame in the GOP; the original key frame of the received video data is encoded as a first P-frame in the GOP; the original second frame of the received video data is encoded as a second P-frame in the GOP, and so on. Before being transmitted as a bitstream to the client 101B the encoded video data is modified by removing the I-frame (which encodes the generated frame based on the image/portions selected from the dataset), thereby reducing bandwidth requirements.

Data identifying the similar image/portion selected from the dataset 206 is also transmitted to the client 101B. As the client has access to its own local version of the image that was used for the generated frame, it can retrieve that local version instead of having to receive data encoding the generated frame from the server 101A. The client can use that data to reconstruct the originally encoded bitstream that included the I-frame F1, and call the existing hardware decoder to decode the I-frame. At the same time the client can set the decoder to a state where it can decode the following relevant P-frames that encode the actual streamed video data. In the description of FIG. 2 below, similarity between a full frame of the received video data and images in the dataset corresponding to full frames is assessed; however, in alternative embodiments (e.g. those of FIGS. 6 and 9), similarities between portions of the received frames and/or a portion of the image(s) stored in the dataset may be assessed.

At step 208 the server 101A can select an image from the dataset 206 that is similar to at least part of a first frame of the received video data. In the case of H.265 and similar video coding standards/techniques this first frame comprises the frame that would be encoded as a key frame (or intra-frame, or I-frame) of a GOP if the video data was directly encoded unaltered. A key frame is normally a single, self-contained frame of a complete image that can be processed independently of other frames and which usually stores all of the data needed to display that frame. However, in other embodiments the key frame may be another type of frame that is self-contained and can be the basis of decoding other frames in a portion/GOP of the video data. Thus, the "first frame" may not necessarily be the frame that is the first in a set of frames in terms of position; it refers to the frame that will normally be encoded as a key frame usable to decode the other frames in the set.

In embodiments the server 101A can perform pre-processing on the received video data before it is input to the hardware encoder (in particular at steps 204, 209) and has some control over the encoder. Embodiments can detect or determine which frame of the video data will be the first frame, e.g. the frame that will be encoded as an I-frame of a GOP. Embodiments can either know in advance that an I-frame will be generated; can force an I-frame to be generated by the encoder, or can detect that an I-frame will be generated by the encoder.

The selected image from the dataset 206 can then be used to generate 209 a frame to be added to the received video data for encoding. In some cases, the selected image may be suitable for being directly inserted/added as a frame without modification; however, in other cases one or more processing steps may need to be performed, e.g. re-formatting, re-sizing, etc, so that it can match characteristics of the received raw video frames that are to be streamed. The generated frame can be added to the received video data as a first frame to be encoded. Detailed examples of how an image from the dataset is selected and inserted will be given below.

At step 210 the video data including the generated frame can be encoded using a suitable technique, e.g. H.265, by the server 101A. The generated frame and the frames of the received video may be encoded through video encoder to generate encoded video data.

At step 212 the encoded video data can be modified by the server 101A so that data corresponding to the frame that was generated using the image selected from the dataset 206 is removed. This can be done because the client 101B will be able to retrieve the necessary image data from its own locally-stored version of the dataset in order to reconstruct the frame and decode the subsequent frames in the bitstream/GOP and so does not need to receive the full frame data in the bitstream. The data corresponding to the generated frame from the encoded video may be bitstream corresponding to the frame using the image or the image portion selected from the dataset. Adding metadata with dictionary ID used may further included in step 212.

At step 214 the video data can be transmitted as a bitstream over the network connection from the server 101A to the client 101B using any technique compatible with the video coding. The data identifying the similar image selected from the dataset 206 is also transmitted from the server to the client.

Figure 3:
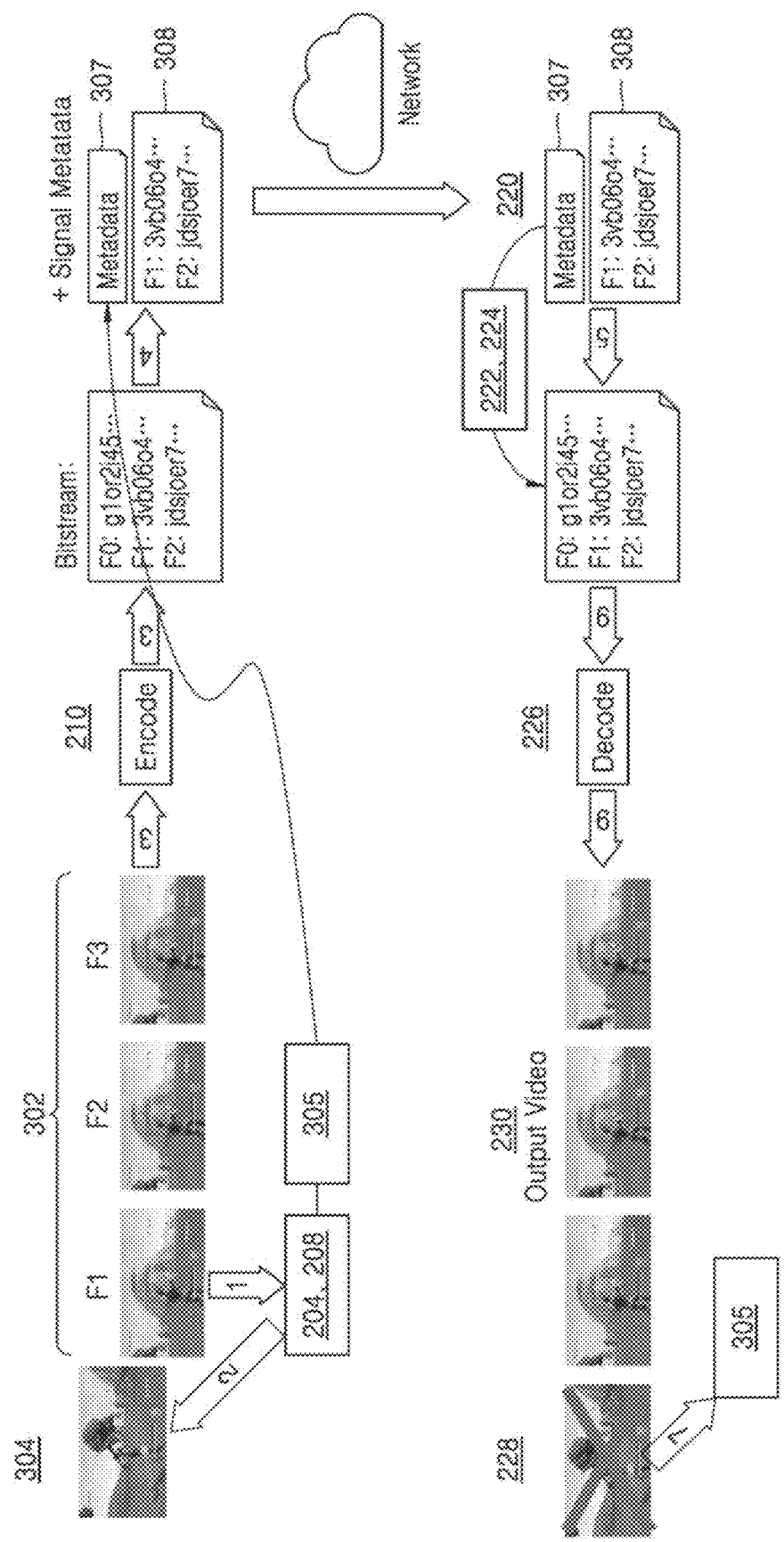
FIG. 3 is a flowchart showing in some more detail the steps performed by the server and client devices.

FIG. 3 schematically illustrates in some more detail examples of operations performed by the server 101A to implement the steps 208-214.

In an embodiment, received (step 202) video data 302 comprises a first frame F1 and subsequent frames F2, F3, etc. The dataset 206 is searched (by accessing step 204 the dataset) to select (step 208) an image 304 that has similarity to the first frame F1. Data, which may be in the form of metadata 307, identifying the selected image can also be generated (step 305).

Any suitable technique can be used to determine this similarity (regarding step 208), e.g. color matching, structural similarity, Structural Similarity Index (SSIM), peak signal-to-noise ratio (PSNR), color average, and so on. In some embodiments a color histogram may be precalculated for each image in the dataset and also stored, e.g. in the dataset, for use in comparing with the first frame. In some embodiments if no similar image exists in the dataset then the frame (or a portion of it) may be added to the dataset. Thus, the server 101A can decide to create a new dataset when it encounters a sequence of frames that it is not able to encode using the images in the existing dataset(s). In such cases the server 101A may determine that none of the images in the dataset(s) have a sufficient degree of similarity with the first frame, e.g. based on a low match value when using an algorithm such as SSIM. In that event the frame (or a portion of it) and, optionally, one or more subsequent frames, may be stored as a new image(s) in the dataset. An updated version of the dataset may be transferred/made available to the client 101B by the server on a periodic, user-initiated or event/update-driven basis.

The selected image 304 can then be used to generate a frame (labelled F0 in FIG. 3) that will be added to the received video frames F1, F2, F3 before the video encoding 210. In the illustrated example the generated frame F0 is prepended (before F1) to the frames of the video data. The generated frame F0 will therefore be encoded as a key frame in the resulting encoded video data 306 in the case of H.265 video coding or similar.

Thus, the generated frame F0 is encoded as an I-frame in the GOP, the original first frame F1 of the received video data is encoded as a first P-frame in the GOP, the original second frame F2 of the received video data is encoded as a second P-frame in the GOP, and so on.

After encoding, but prior to transmission as a bitstream, the encoded video data/GOP is modified by deleting 212 from it data corresponding to the generated frame F0, resulting in modified encoded video data 308 that is transmitted 214 over the network connection to the client 101B. In more detail, portion of bitstream 306 corresponding to the generated frame F0 may be removed. The data/metadata 307 identifying the selected image may be generated.

The data/metadata 307 identifying the selected image is also transmitted to the client 101B. In some embodiments the data/metadata 307 is transmitted from the server 101A to the client separately from the bitstream of encoded video data, but in a coordinated/synchronized manner to try to ensure that both the appropriate portion of the bitstream and the relevant data/metadata 307 are received in time so as to allow decoding to be performed effectively. In alternative embodiments the data/metadata 307 is included in the bitstream itself, e.g. in a header of a frame of the relevant GOP.

Figure 4:
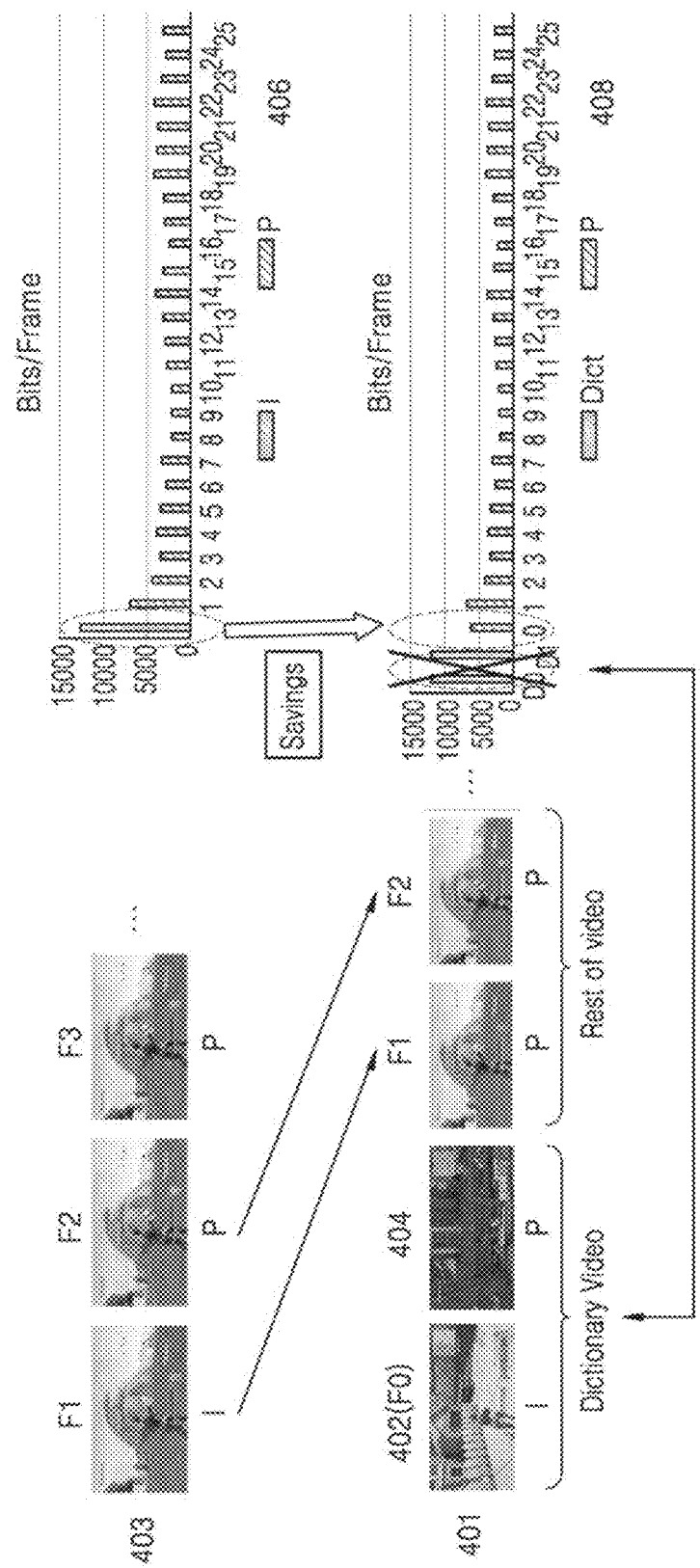
FIG. 4 schematically compares frames encoded for transmission by an alternative embodiment and original frames of received video.

FIG. 4 schematically illustrates the relationship between frames 401 encoded for transmission by an alternative embodiment and the original frames 403 of the received video data.

As in the embodiment disclosed above, the first frame F1 of the original video data that would conventionally be encoded as an I-frame by the standard encoding method is effectively encoded/transmitted as a first P-frame in the bitstream produced by the embodiment. Thus, no I-frame needs to be included in the bitstream of the embodiment, which significantly reduces bandwidth usage. However, in the embodiment of FIG. 4 one or more intermediate P-frame(s) 404 can be encoded between the I-frame F0 and the first frame F1 of the original video data. The I-frame 402 (encoded version of the frame F0 generated using the image selected from the dataset 206) and an intermediate P-frame 404 encoded between it and the first frame F1 of the original video data can then be deleted from the encoded video data prior to it being transmitted to the client 101B. As in other embodiments, the data/metadata 307 identifying the selected image can be used to reconstruct the I-frame F0 at the client prior to decoding. However, the embodiment of FIG. 4 can increase the amount of processing required by the decoder compared to embodiments that do not use the intermediate P-frame(s) and only generate and process and the (one) I-frame (the encoded version of the generated frame F0).

Charts 406 and 408 graphically compare the resulting bandwidth usage resulting from transmitting the frames produced by the embodiment 401 and the conventional encoding method 403, respectively. As well as the bandwidth usage reduction provided by embodiments, the bitrate is also more evenly distributed (i.e. less spiky) during transmission, which can beneficially result in more stable connections and reduced latency.

Further, embodiments do not merely provide advantages only when a low bitrate connection is available. To illustrate, the table below illustrates data transmission savings and improved quality achieved by an example embodiment compared to conventional encoding and streaming without use of the embodiment. The embodiment was a simple example using a dataset including only one image, but still demonstrated improvements:

|  | Av kbps | P-PSNR | P-SSIM (db) |
| --- | --- | --- | --- |
| Standard encoding | 14444 | 55.41 | 27.67 |
| Embodiment | 14379 | 55.427 | 27.68 |
|  | −0.4% | +0.02db | +0.001 |

Returning to FIG. 2, at step 220 the client 101B can receive the transmitted bitstream comprising the encoded video data and also receives the data/metadata identifying the selected image.

At step 222, the client 101B can access its copy of the dataset 206 and use the received data/metadata identifying the selected image to retrieve the appropriate image data from the dataset. It uses this to generate, at step 223, the frame F0 and can then encode the generated frame using the same standard encoder/technique as used by the server 101A, e.g. H.265. At step 224, the client inserts/prepends data corresponding to the encoded generated frame to the received bitstream to produce a modified bitstream that is compatible with the video codec being used. The inserted/prepended/added data may be pre-encoded version of the image or the portion of the image retrieved from the dataset.

At step 226 the client 101B can decode the modified bitstream including the inserted data using a suitable conventional video decoding technique, e.g. H.265.

At step 228 the client 101B can discard data corresponding to the frame F0 from the decoded video data. This can be done because the purpose of that frame was to allow the subsequent frames to be decoded in a bandwidth efficient manner, rather than to be directly displayed.

At step 230 the client 101B can display video based on the non-discarded decoded video data in a conventional manner.

Referring again to FIG. 3, this also schematically illustrates more detailed examples of operations performed by the client 101B to implement the steps 220-230.

After receiving 220 the bitstream comprising the encoded video data 308 and the data/metadata 307 identifying the selected image the client can parse the metadata to generate/reconstruct the key frame F0 (that was removed from the bitstream data by the server 101A at step 212). This can involve the client accessing (step 222) its copy/version of the dataset 206 to retrieve the same image 304 in the dataset that was determined (by the server 101A at step 208) to have similarity to the original first frame F1 of the video data 302. That retrieved image is then used to reconstruct the frame F0, which is then encoded and prepended to the bitstream as its I-frame before the first P-frame F1 (step 224). The bitstream is then decoded (step 226), and, at step 228, data corresponding to the reconstructed frame F0 is discarded before the remaining frames of the bitstream are displayed (step 230).

FIG. 5 is a flowchart showing how a dataset may be generated by embodiments. Embodiments are intended to generate one or more "dictionary" datasets comprising at least one image expected to have similarity to frames streamed in a bitstream produced by a future execution of the same, or related, source of video data.

At step 502, first video data is received. The first video data may be generated by a source that will stream further video data in future that is expected to have significant visual similarities to the first video data. In some cases, the first video data may be generated by a game application. For instance, the first video data may comprise video that data that is output/generated as the game is player for a period of time (e.g. 1 hour or more). This may be normal gameplay or the game may be played in a structured/predefined manner that is intended to result in common scenes, or common types of scenes, being displayed. In alternative embodiments, different types of applications other than games may be used. For instance, the source of the first video data may be a video content creator entity that produces a series of videos having visual similarities/repetition. Such similarities/repeated content can include animation, transitions, intros/outros, same/similar people or locations, and so on. Examples include news type programs where the borders have the same style as well as the frequent reappearance of the same presenters and reporters; interviews where the same camera locations, angles and/or backgrounds are used for different interviewees, and so on.

At step 504, one or more frames of the first video data are selected for inclusion in one or more datasets 206. The selected frames may comprise one or more frames/short video clips. In some cases the frames may be selected in a random/pseudo-random manner. However, embodiments may select frames from the first video data in a more deliberate manner. For example, embodiments may select frames from the first video data that are dissimilar to each other but at the same time have similarity to other frames in the data. That is, distinctive frames that can have similarity to a large subset of frames of the first video data. In cases where the first video data is generated live, embodiments can select frames from (all/a portion of) the first video data that have low/no similarity to frames already in the dataset, but do have similarity to other frames in the first video data. The dataset may include an identifier/filename reflecting the source of the first video data so that it can be appropriately accessed by the server/client when further video data is being streamed in future.

All or part of the selected frames can be stored, at step 506, as images in the dataset(s) and with the intention of being useable to generate a frame for encoding/decoding a video stream according to embodiments as described herein. In some embodiments more than one dataset 206 for a particular video or video-outputting application (or sets of videos or applications) may be provided for the server 101A and the client 101B in order to further improve efficiency of video streaming. For instance, games typically offer the user a choice of character that, for example, explore a series of different levels. There are usually a significant number of permutations of characters and levels and so it would be impractical to provide a dataset that includes images intended to be similar to so many possible scenes. However, the present inventors have appreciated that providing datasets based on commonly-used graphical assets of a game, for instance, which can be combined will offer streaming efficiencies.

Figure 6:
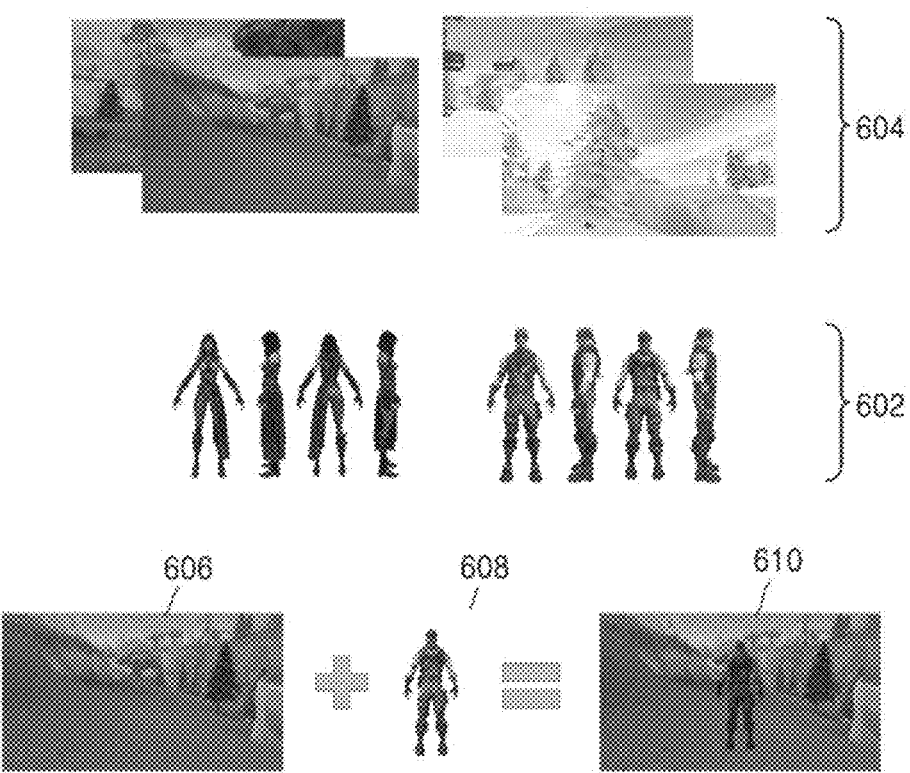
FIG. 6 schematically illustrates graphical assets of a game application that can be processed by an embodiment.

FIG. 6 schematically illustrates examples of graphical assets of a game application that can be processed by some embodiments. In the example there are two characters that can be shown from any desired viewpoint/perspective during gameplay. The game will also generate/display a large number of different backgrounds on top of which the characters can be shown. In some embodiments during creation of datasets image segmentation may be performed on frames generated by the application to obtain a foreground layer (e.g. containing the character) and a background layer. The foreground layer may be stored in at least one first dataset 602, and the background layer may be saved in at least one second dataset 604. In practice, the first and second datasets may be stored together or separately in one or more data structures or files on the server 101A and the client 101B. It will also be appreciated that many variations are possible. For instance, more than one dataset may be provided for each layer; more than two layers of a frame may be processed in this manner; graphical assets/layers other than characters and backgrounds may be processed, and so on.

The multiple datasets 602, 604 are made accessible to the server 101A and the client 101B in a similar manner to the other embodiments described herein. Operations corresponding to those of other embodiments in relation to creating a bitstream that includes an identifier for a similar image in a dataset are also carried out in relation to each of the two layers.

In more detail, the server 101A may perform image segmentation on the first frame of the video data to obtain a foreground layer image and a background layer image, for example. An image 606 from the first dataset that is most similar to the foreground layer image of the first frame is selected by the server 101A, and an image 608 from the second dataset that is most similar to the background layer image of the first frame is also selected. Data, which may be in the form of metadata, identifying the selected images is also generated. A frame 610 can then be generated using the selected images. In some cases this generating may involve superimposing the selected foreground image on the selected background image; however, the images may be combined in any other suitable manner and/or additional processing (including, but not limited to, those disclosed above) may also be performed. The generated frame can be added as a first frame to the game application's video data that is to be encoded. That bitstream can be encoded using any suitable technique, and the encoded bitstream can be modified so that data corresponding to the generated frame is removed from it. The bitstream and the metadata can then be transmitted over the network connection from the server 101A to the client 101B.

At the client 101B operations corresponding to those disclosed above in relation to decoding a bitstream and using metadata are also carried out in relation to each of the two layers. In particular, the client can access its copies of the multiple datasets 602, 604 and use the received metadata to obtain the appropriate images 606, 608 from each of them. It can then generate the frame 610 (typically using operations corresponding to those performed by the server 101A to generate the frame from the selected similar images, e.g. superimposing foreground on background) from the obtained images and insert data corresponding to the generated frame into the received bitstream. The client can decode the bitstream and discard data corresponding to the frame that was generated. The client can then display video based on the non-discarded decoded video data.

Figure 7:
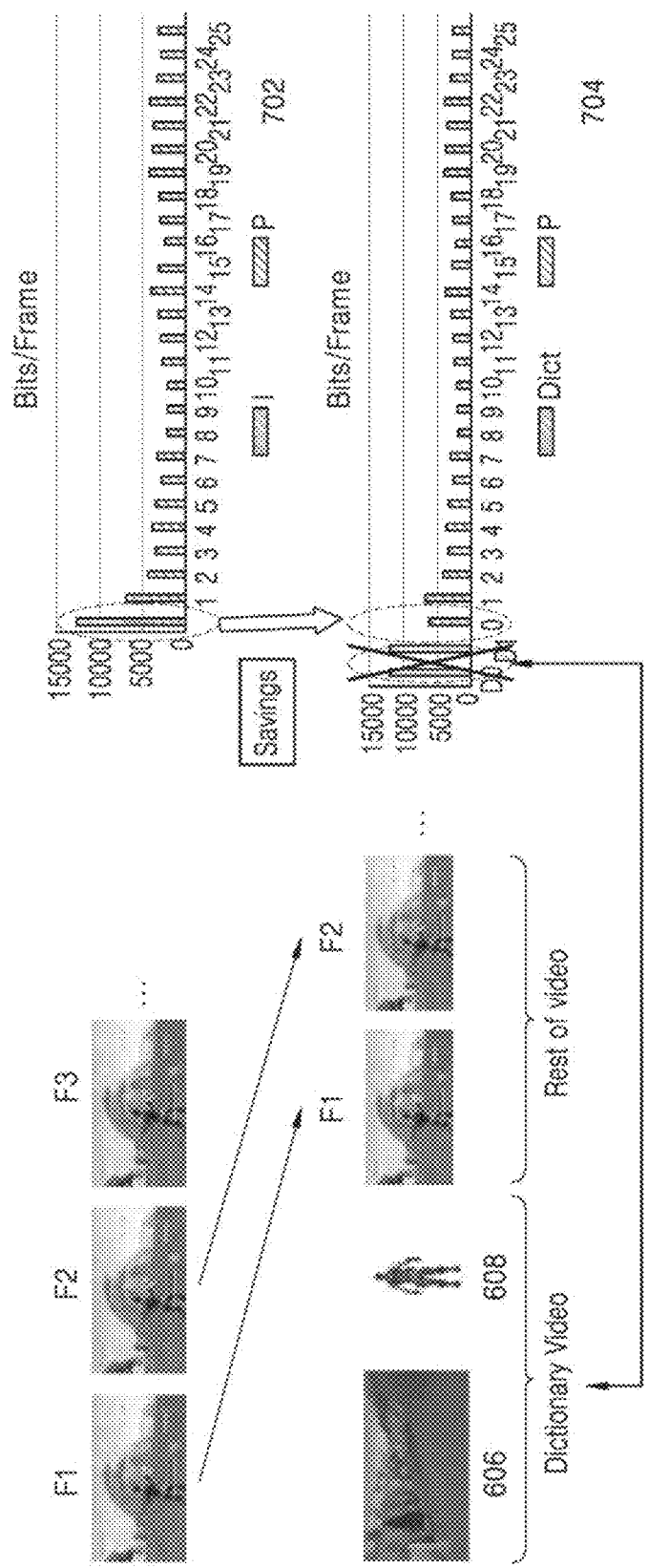
FIG. 7 schematically illustrates the relationship between frames encoded for transmission by the embodiment of FIG. 6 and the original frames of the received video.

FIG. 7 schematically illustrates the relationship between frames encoded for transmission by the embodiment of FIG. 6 and the original frames of the received video. As in the embodiments disclosed above, the first frame F1 of the original video data (that would be encoded as an I-frame in the conventional method) is encoded and transmitted as a first P-frame in the bitstream transmitted by the embodiment. This is done by generating an I-frame based on the selected images 606, 608 of the first and second datasets 602, 604 by overlaying the character image 608 on the background image 606 in the example. However, as in other embodiments, data corresponding to the encoded I-frame is deleted and is not transmitted; instead, the data identifying the selected images 606, 608 is used to reconstruct the first frame at the client 101B.

Charts 702 and 704 graphically compare the resulting bandwidth usage by the embodiment and the conventional encoding/streaming method, respectively. As well as the reduction provided by embodiments, bitrate is also more evenly distributed (i.e. less spiky), which can beneficially result in more stable connections and reduced latency.

Figure 8:
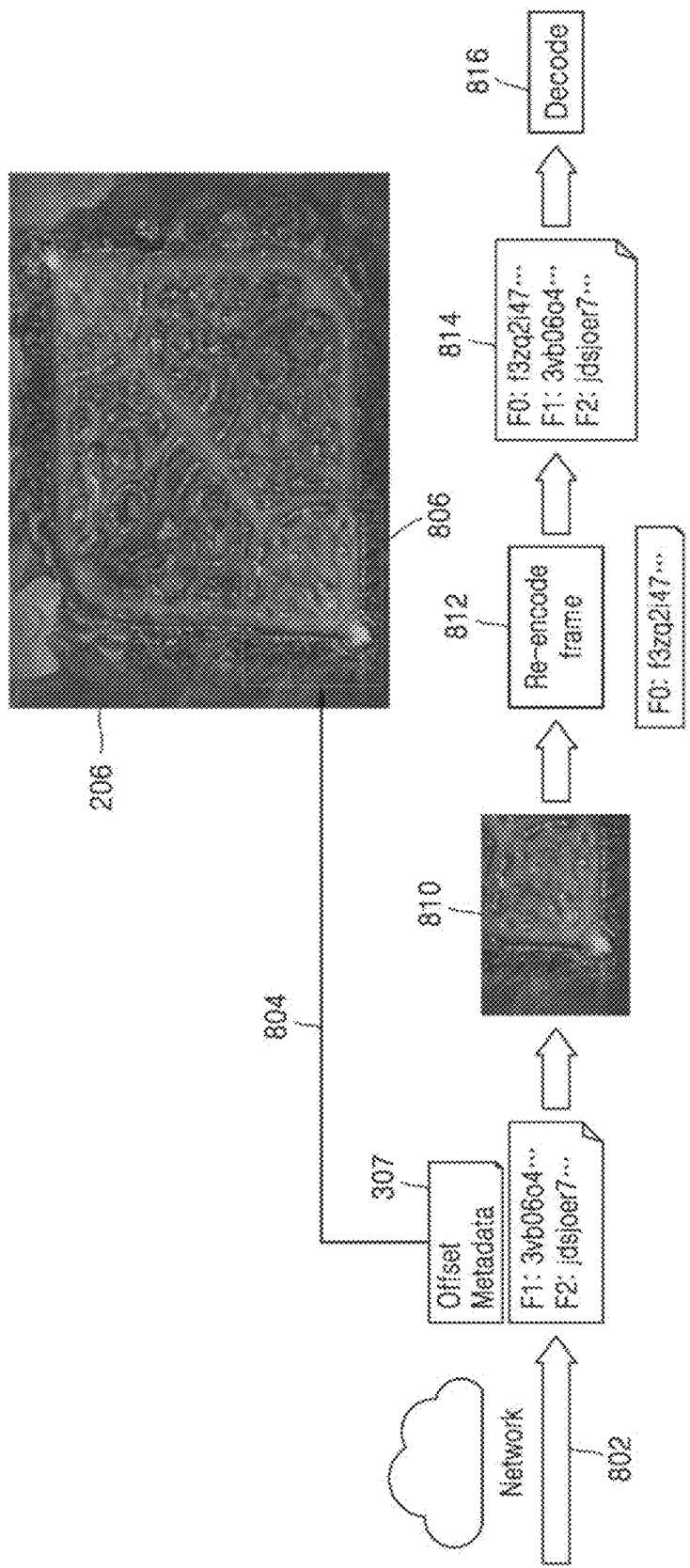
FIG. 8 schematically shows an embodiment processing a background image output by a game application.

FIG. 8 schematically illustrates an embodiment that stores and processes a dataset including an image having repeated portions. Some applications, including game applications in particular, often use images, such as scene backgrounds, that include repeated content. The repeated content may be a portion of a pattern that is repeated at regular or irregular intervals (in any direction). The repeated content may be exactly the same in each repeat/occurrence or it may be modified in some manner, e.g. resized, recolored or reoriented. Embodiments can provide a dataset (or multiple datasets in some cases) that stores at least one image that is larger in size/dimensions than the size/dimensions of a frame normally output by the application. The dataset may contain several such images, each corresponding to backgrounds displayed in different parts/levels of the game, for instance. Embodiments can transmit information identifying a portion of the image that is similar to the first frame of received video data (instead of transmitting an encoded version of the first frame) in order to improve streaming efficiency.

In more details, video data to be streamed, including a first frame, is output by the game application. The server 101A receives the video data and accesses the dataset 206. The server can select a portion of the image from the dataset that has similarity to the first frame of the video data using any suitable searching technique. In some cases, the similarity between the first frame and the portion of the image in the dataset may be based on the whole first frame, or only on a particular portion or layer, e.g. the background layer, of the first frame. The selected portion of the image will then be used to generate a frame. In some cases, the selected image portion may be suitable for being directly inserted/added as a frame without modification; however, in other cases one or more processing steps may be performed, e.g. re-formatting, re-sizing, etc. The generated frame can then be added to the received video data in such a manner that it will normally be encoded as the key frame/I-frame by the encoder. The encoded video data can then be modified by the server so that data corresponding to the generated frame/I-frame is removed. The encoded video data can be then transmitted as a bitstream over the network connection from the server to the client 101B. Data identifying the portion of the image selected from the dataset is also transmitted from the server to the client.

At the client 101B, the transmitted bitstream F1, F2, . . . comprising the encoded video data is received (step 802) as well as the data/metadata 307 identifying the selected image portion. The client can access (step 804) its copy of the dataset 206 and use the received data identifying the selected image portion to retrieve the appropriate image portion 806 from the dataset.

The data identifying the image portion may define a portion of the large image stored in the dataset in any suitable manner. For instance, as shown in FIG. 8, the portion may comprise a rectangular portion that is offset from an origin (0, 0) of the large image in the dataset and may include information identifying coordinates. It may include data identifying the extent/dimensions (length, width) of the portion within the large image, or the dimensions may be fixed/predefined. The obtained image portion 806 is used to generate/reconstruct (step 810) the frame F0. Data corresponding to the generated frame is added to the received bitstream, e.g. by re-encoding (step 812) the generated frame using the same encoder, e.g. H.265, as the server and prepending to the encoded frame of the GOP in the bitstream to produce a modified bitstream 814, which can then be decoded (step 816). Data corresponding to the generated frame F0 may be discarded before the remaining decoded video data is used to display video.

Figure 9:
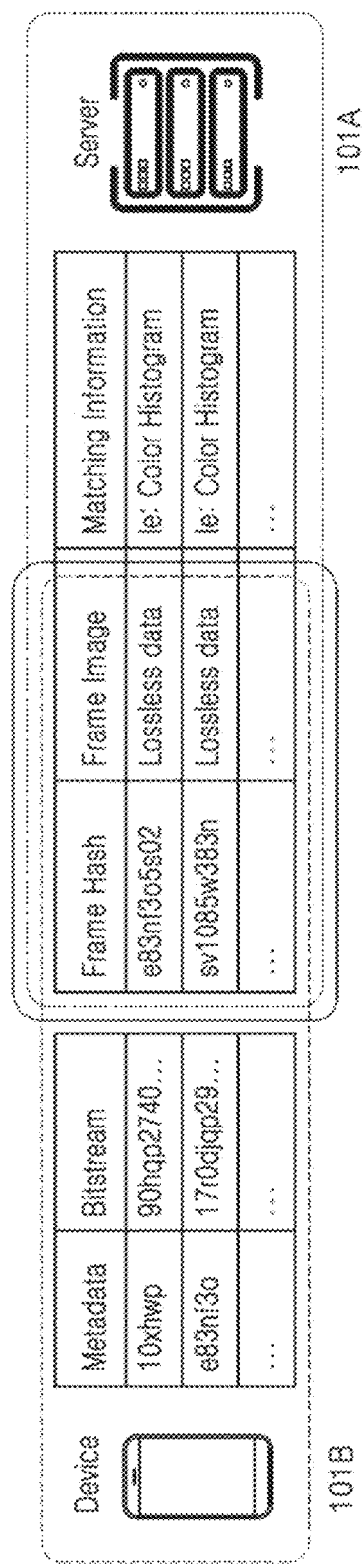
FIG. 9 schematically illustrates versions of example datasets.

FIG. 9 schematically illustrates example datasets accessed/stored by the server 101A and client 101B. The corresponding versions of a dataset accessed/stored by both the devices will contain the same basic data. As a minimum, the versions will generally contain the at least one image as disclosed above. An identifier, e.g. hash, look-up key, etc, for the/each image will also be included as data common in all versions.

In some cases additional data may be present in a version of the dataset accessed/stored by the server 101A. Additionally or alternatively, additional data may be present in the version of the dataset accessed/stored by the client 101B. For example, the additional data stored in the version accessed/stored by the server may optionally comprise information that can speed up similarity matching with the video data frames, such as sorted color histogram data or structural similarity information. This information can help the server match the incoming frames to an image in the dictionary.

In some embodiments the additional data stored in the version accessed/stored by the client may optionally comprise a store/cache of metadata and encoded image data. For example, if the dataset 206 only contained 5 images then it would be relatively inefficient to encode those 5 images over and over again whenever they are selected as having similarity to the first frame of the video data. Therefore, a cache can be stored on the client that contains data corresponding to the encoded version of an image (e.g. FrameHash→Encoded bitstream data). When an embodiment selects an image (step 208) that is stored in this cache then the encoded version of the selected image can be retrieved from the cache and directly added to the encoded video data to be streamed instead of performing the steps (209, 210) of generating a frame and encoding that generated frame in the manner described above, thereby saving processing resources. In such cases the encoding can comprise prepending the pre-encoded version of the selected image to the frames of the received video data for the encoding to produce the encoded video data.

Figure 10:
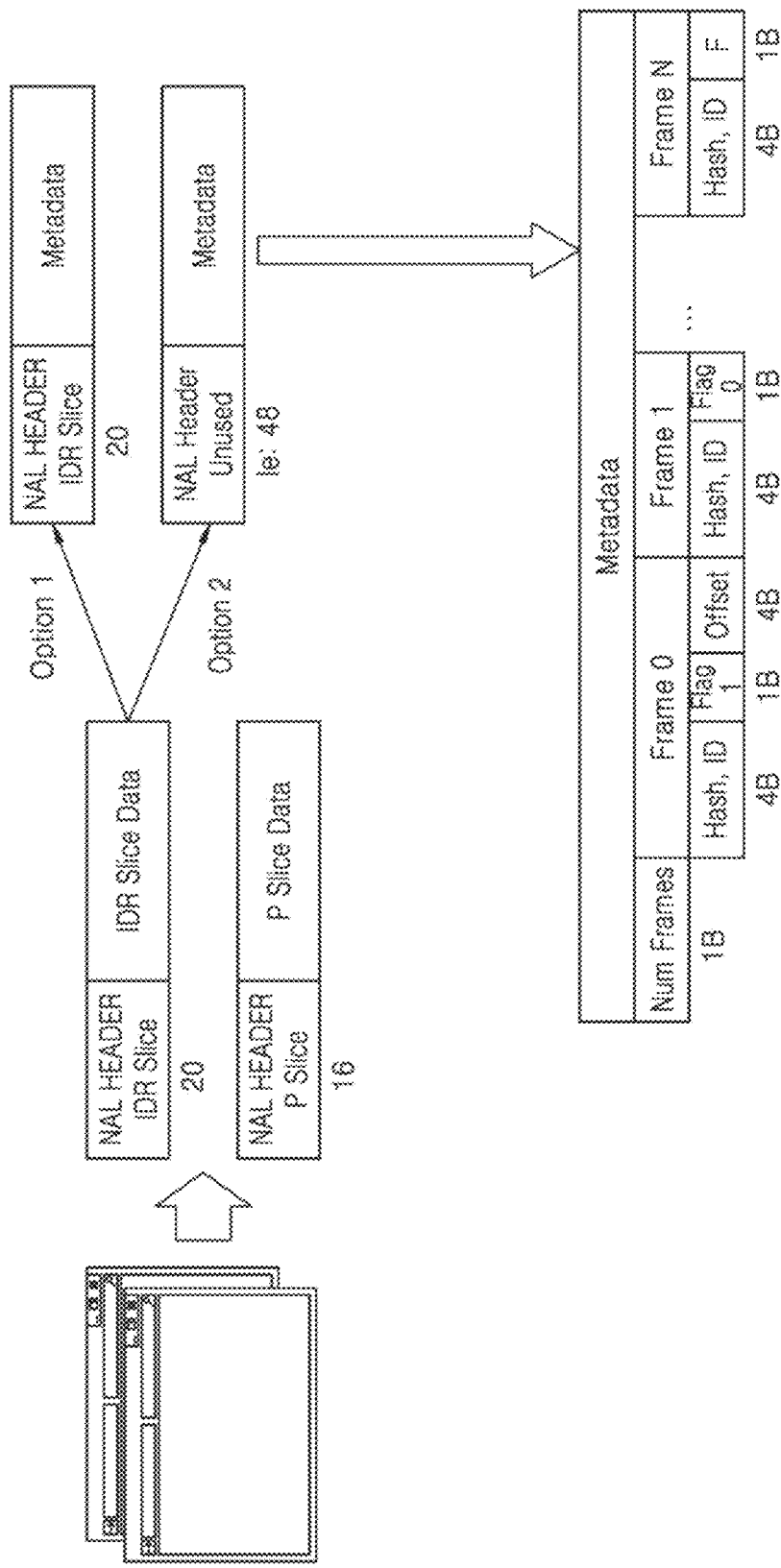
FIG. 10 schematically illustrates how metadata can be encoded by an embodiment.

FIG. 10 schematically illustrates how a frame in the encoded bitstream can be modified by the server 101A to include the metadata 307. The example relates to H.265 video encoding and will be similar for H.264, and the skilled person will be able to achieve similar results for frames/bitstreams of other coding standards/techniques.

In the example the bitstream is composed of Network Abstraction Layer (NAL) packets (6 bits for type followed by the NAL data). I-frames (IDR) can be routinely identified and subsequently replaced/modified in the bitstream. In some embodiments the NAL IDR packets can be replaced by a new NAL packet type based on currently unused/reserved bits (48-63 are currently unused) that include the data/metadata identifying the image 304 selected from the dataset 206. In alternative embodiments, the NAL IDR slice data is replaced with the data/metadata whilst retaining the unaltered header of the packet. In some embodiments the metadata packet can include "instructions" to reconstruct the key frame on the client 101B (according to the embodiments of FIGS. 6 and 8, for instance). An example of the data types of such a metadata packet is shown below:

NumFrames: How many images (e.g. corresponding to different layers) are used to generate the frame, e.g. by stacking/superimposing one of top of another.
HashID: identifier of the image in the dataset.
Flag: 0: image not to be offset; 1: Offset it by some pixels.
Offset: 2B signed short, X and Y offsets/coordinates.

In total, the size of the metadata can be around 10 Bytes.

Embodiments can enable effective video streaming even with a very low bandwidth by exploiting the referencing of image data in the dataset. There is no need to change existing video codecs/technology. Bitrate may be more evenly distributed, leading to stabler connections and less latency.

Attention is directed to any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A computer-implemented method of encoding video data, the method comprising:
receiving video data comprising frames;
accessing a dataset comprising at least one image expected to have similarity to at least one of the frames of the video data;
selecting a portion of an image, from the dataset, based on similarity to at least a portion of a first frame of the video data,
wherein the similarity to the at least the portion of the first frame is identified by at least one of: color matching, structural similarity, Structural Similarity Index (SSIM), peak signal-to-noise ratio (PSNR), or color average, and the image is larger in at least one direction than the first frame;
generating a frame containing the image or the portion of the image;
encoding the generated frame and the frames of the video data to produce encoded video data, by prepending the generated frame as the first frame to the video data such that the generated frame is encoded as a key frame of the encoded video data;
removing data corresponding to the generated frame from the encoded video data to produce modified encoded video data;
generating metadata identifying the portion of the image that has the similarity to the at least the portion of the first frame; and
transmitting the modified encoded video data as a bitstream, and the metadata, to a client device configured to access a corresponding dataset,
wherein the metadata is in a header of a frame or packet in the bitstream.

2. The method as claimed in claim 1,
wherein the video data is generated by a current execution of an application, and the at least one image in the dataset was generated by at least one previous execution of the application, or
the video data comprises a video in a series and the at least one image in the dataset was obtained from at least one other video in the series.

3. The method as claimed in claim 1, further comprising:
accessing a plurality of datasets, each comprising a plurality of images expected to have similarity to at least one of the frames of the video data, wherein each of the plurality of datasets is associated with a different layer of the first frame;
performing image segmentation on the first frame to obtain a foreground layer image and a background layer image;
selecting an image from a first dataset that has similarity to the foreground layer image;
selecting an image from a second dataset that has similarity to the background layer image;
generating data identifying the image selected from the first dataset and the image selected from the second dataset, and
generating the frame by combining the image selected from the first dataset and the image selected from the second dataset.

4. The method as claimed in claim 1, wherein the portion of the image selected from the dataset comprises a scene background image including spatially repeated content.

5. The method as claimed in claim 1, wherein the generating of the frame comprises:
retrieving data comprising a pre-encoded version of the portion of the image selected from the dataset, and
wherein the encoding of the generated frame and the frames of the video data comprises:
prepending the pre-encoded version of the portion of the image selected from the dataset to the frames of the video data for the encoding to produce the encoded video data.

6. The method as claimed in claim 1, further comprising:
determining that no images in the dataset have a sufficient degree of similarity with the first frame;
subsequently storing the first frame as a new image in the dataset; and
transferring an updated corresponding version of the dataset including the new image to the client device.

7. A computer-implemented method of decoding streamed video data, the method comprising:
receiving a bitstream comprising:
frames of encoded video data comprising a first frame; and
a header of a frame or packet comprising metadata identifying a portion of an image that is larger in at least one dimension than the first frame,
wherein the portion of the image has similarity to at least a portion of the first frame, and the similarity is identified by at least one of color matching, structural similarity, Structural Similarity Index (SSIM), peak signal-to-noise ratio (PSNR), and color average;

accessing a dataset comprising at least one image expected to have similarity to at least one of the frames of the encoded video data to obtain the image;

generating a frame containing the portion of the image, by encoding the generated frame using a same encoding method used to encode the encoded video data in the bitstream, to generate an encoded generated frame;

adding data corresponding to the encoded generated frame to the bitstream, by prepending the data corresponding to the encoded generated frame to the bitstream, to produce a modified bitstream, wherein the data corresponding to the encoded generated frame is encoded as a key frame of the encoded video data;

decoding the modified bitstream to produce decoded video data; and discarding data corresponding to the generated frame from the decoded video data.

8. The method as claimed in claim 7, the decoding of the bitstream comprises:

decoding the modified bitstream including the prepended data.

9. The method as claimed in claim 7, the data added to the bitstream is a pre-encoded version of the portion of the image.

10. A non-transitory computer-readable storage medium, having a computer program stored thereon that performs, when executed by at least one processor:

receiving a bitstream comprising:
 frames of encoded video data comprising a first frame; and
 a header of a frame or packet comprising metadata identifying a portion of an image that is larger in at least one dimension than the first frame,
 wherein the portion of the image has similarity to at least a portion of the first frame, and
 the similarity is identified by at least one of color matching, structural similarity, Structural Similarity Index (SSIM), peak signal-to-noise ratio (PSNR), and color average;

accessing a dataset comprising at least one image expected to have similarity to at least one of the frames of the encoded video data to obtain the image;

generating a frame containing the image or the portion of the image, by encoding the generated frame using a same encoding method used to encode the encoded video data in the bitstream, to generate an encoded generated frame;

adding data corresponding to the encoded generated frame to the bitstream, by prepending the data corresponding to the encoded generated frame to the bitstream to produce a modified bitstream, wherein the data corresponding to the encoded generated frame is encoded as a key frame of the encoded video data;

decoding the modified bitstream to produce decoded video data; and discarding data corresponding to the generated frame from the decoded video data.

* * * * *